March 17, 1925.

J. BROMBACHER 1,529,768

AUTOMATIC FLUID CONTROL

Filed Oct. 9, 1922

INVENTOR.
JULIUS BROMBACHER.
BY
ATTORNEY.

Patented Mar. 17, 1925.

1,529,768

UNITED STATES PATENT OFFICE.

JULIUS BROMBACHER, OF LOS ANGELES, CALIFORNIA.

AUTOMATIC FLUID CONTROL.

Application filed October 9, 1922. Serial No. 593,484.

*To all whom it may concern:*

Be it known that I, JULIUS BROMBACHER, a citizen of the United States, residing at Los Angeles, county of Los Angeles, and State of California, have invented a certain new and useful Automatic Fluid Control, of which the following is a specification.

My invention relates to a fluid control and has especial reference to automatic means for controlling the flow of gaseous fluids to burners, more especially those employed in heating water, an object of the invention being to provide a simple, positive and effective contrivance for making safe any water heater using gas as a heating medium, against either the danger of gas escape or explosion.

Another object of the invention is to provide a safety control for gas-water heaters, either of the instantaneous or storage type, in which the physical conditions of heat and cold are respectively brought into play to control the flow of gas to the burner, under all normal and abnormal circumstances, such for instance, as extinction of the pilot flame, faulty or wholly impaired operation of a thermostatic unit, where such is used, or excessive temperature of the water.

Figure 1:
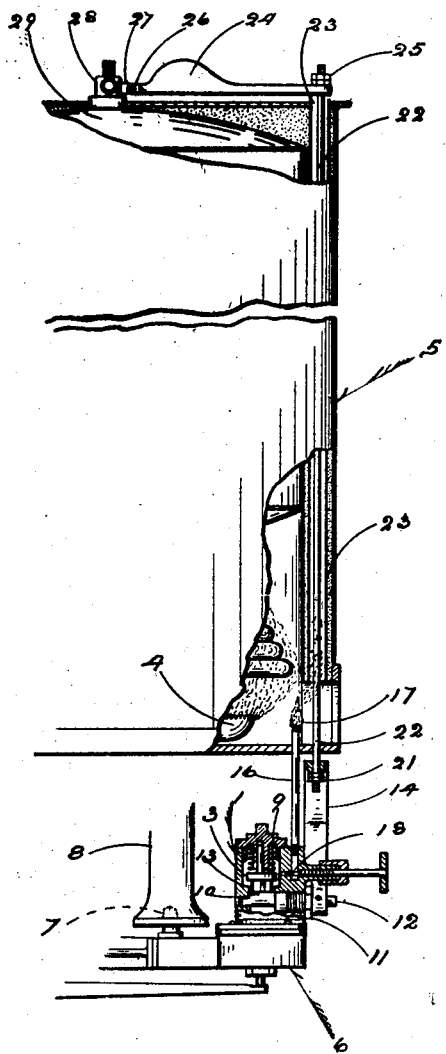
Figure 2:
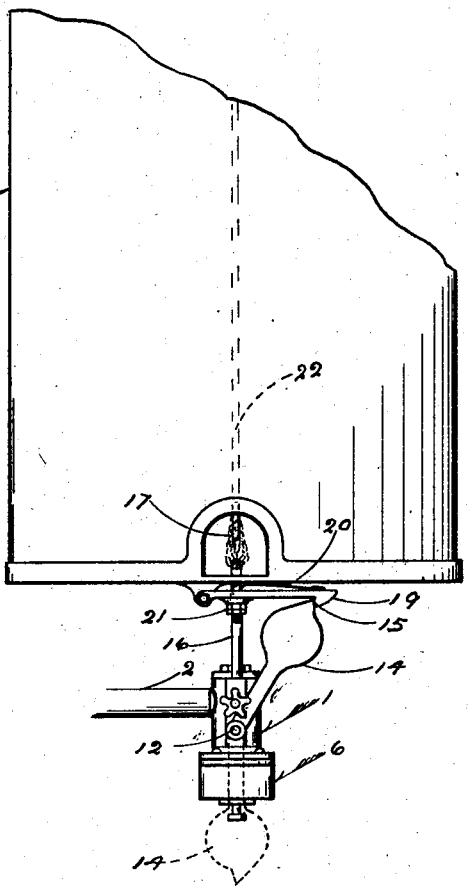

These and other objects are set forth in the following specification in connection with the accompanying drawing, in which, Fig. 1 is a fragmentary side elevation, partly in section, showing the valve controlling mechanism, in association with a water heater and its appurtenant parts, and Fig. 2 is a fragmentary front elevation of Fig. 1.

The invention, broadly considered, consists of a valve controlling mechanism and controlling means for said mechanism, directly influenced by a flame; and a secondary controlling means independent of said pilot flame and directly influenced for operation by the heat of the water.

Specifically my invention comprises a valve housing 1, connected with a main gas supply 2, and containing a valve 3, for governing the flow of gas directly to a suitable burner 4, of a gas water heater 5, or indirectly through a thermostatically controlled gas valve, generally indicated as 6. In the latter case, that is where a thermostatic unit is employed for regulating the temperature of the water, the valve housing 1, is arranged to be bolted on to the valve 6, that is under influence of the thermostatic unit, whereby free communication is established between the two valve housings 1 and 6, and the gas conducted through a jet 7, into the mixing chamber 8, of the burner 4.

The valve 3, contained in the housing 1, is under the tension of a spring 9, which is arranged to force and hold said valve upon a seat 10, to shut off the flow of gas, through the valve, as, and under the conditions hereinafter explained.

Said housing 1, is preferably provided with a journal bushing 11, through which is extended a shaft 12, provided with an eccentric portion 13, disposed in operative relation to the valve 3, and through the medium of which the said valve is unseated and held unseated or in open position to permit the gas to flow to the burner 4. On the end of the shaft 12 is provided a weighted lever 14, formed with an extension 15, for the purpose presently to appear, this lever 14, in the position indicated in dotted lines, Fig. 2, having turned the shaft and with it the eccentric portion 13, and permitted the valve 3 to seat under the tension of the spring 9.

A tube 16, for conveying gas from the inflowing supply for a pilot flame 17, is provided in the valve housing 1, the quantity of such gas for the pilot flame 17, being regulated by a needle valve 18.

To permit the flow of the gas through the valve housing 1, and eventually to the burner 4, the weighted lever 14, is raised to the position, shown in Fig. 2, and there held by engagement of the extension 15, with a latch 19, only while the pilot flame is burning, as explained hereafter. The elevation of such lever 14 to the position indicated, turns the eccentric portion of the shaft 12 and unseats the valve 3.

The latch 19 is pivotally mounted on the heater and is under the tension of a spring 20, which, when the influence of the pilot flame is present, insures the engagement of the latch with the weighted lever 14. When not in engagement with the weighted lever 14, as will appear hereafter, the movement of the said latch 19 relative to the heater is restrained by a plurality of nuts 21 on the end of a rod 22, which may extend through a pipe 23, preferably in the insulation in the heater, and also freely through a weighted lever 24, which overhangs the upper end of the pipe 23. The rod 22 is suspended from said lever 24 by adjustable means, as nuts 25, screwing on the end of the rod and bearing upon the upper surface of the lever 24, and the pipe 23 constitutes a rest or seat for the lever 24. The other end of the lever 24, is supported and held in inoperative position, as appearing hereafter, by a pin 26, which connects the end of said lever 24 with a lug 27, on a fitting 28, provided on the top of the water tank 29. This pin 26 is of a material or metal that will fuse at a predetermined temperature, that is, in the present instance, a heat above boiling point, such heat being conducted through the fitting 28, to the fusible pin 26. If for any reason, the water becomes overheated, that is, heated beyond a predetermined temperature, the heat will be conducted through the fitting 28, and fuse the pin 26, in consequence of which, that end of the lever 24, will drop. The upper end of the pipe 23, then becomes a fulcrum and the rod 22, moved upwardly by said lever 24, lifts the latch 19, and permits the weighted lever 14, to fall to the dotted position, shown in Fig. 2. Such action of the lever 24, turns the eccentric portion of the shaft 12, away from the valve 3, which then seats immediately under the pressure of the spring 9, preventing the passage of any further supply of gas and thus extinguishing the flame of the burner 4. In this manner the danger of explosion or other injury is avoided.

The lower portion of the rod 22, as seen, is directly under the influence of the pilot flame 17, the heat from which passes upwardly in said pipe 23. The rod 22, therefore, in response to such thermal influence, becomes elongated, and in so doing, permits the latch to move within the arc described by the weighted lever 14. So long as the pilot flame or its heat plays against the rod 24, and the temperature of the water has not exceeded that predetermined by the pin 26, the latch 19, will continue to hold the weighted lever in elevated position, in which position the valve 3 is wide open and the gas may be supplied to the burner in the variable quantities demanded by the temperature of the water. However, should the pilot, or flame 17 become extinguished, the contraction of the rod 22, ensuing on cooling, will lift the latch 19 and permit the weighted lever 14 to fall, whereupon the valve 3 instantly seats, and shuts off the gas from the burner. Obviously, where a thermostatic unit is employed, the valve 3 will seat under the condition just described before the cooling water shall have influenced the thermostatic unit to open the gas valve immediately under its control. Thus the loss and escape of gas is effectively guarded against and the heater is made absolutely safe against all danger.

What I claim, is:

1. In a water heater, the combination of the main gas burner and the pilot burner, of a valve to control the supply of gas to the main burner, means for operating said valve, a latch co-operating with said means for holding open said valve, a rod connected at one end with said latch and influenced by the pilot flame to permit said latch to engage said valve operating means, a lever connected with the other end of said rod, and means controllable by the temperature of the water to cause said lever to operate said rod.

2. The combination in a water heater, with the main gas burner and the pilot burner, of a valve to control the supply of gas to said main burner, means for operating said valve, a latch co-operating with said means for holding open said valve, a rod having one end thereof in engagement with said latch and influenced by the pilot flame to permit engagement of said latch with said operating means, a lever to which the other end of said rod is connected and means normally holding said lever inoperative, said means controllable by the temperature of the water to cause said lever to move and operate said rod.

In testimony whereof I have set my hand.

JULIUS BROMBACHER.